(12) United States Patent
Cheng

(10) Patent No.: US 7,142,374 B2
(45) Date of Patent: Nov. 28, 2006

(54) OPTICAL SYSTEM FOR LASER RIFLESCOPE

(75) Inventor: Liao Chen Cheng, Taichung (TW)

(73) Assignee: Asia Optical Co., inc., Taichung (TW)

(*) Notice: Subject to any disclaimer, the term of this patent is extended or adjusted under 35 U.S.C. 154(b) by 0 days.

(21) Appl. No.: 11/128,255

(22) Filed: May 13, 2005

(65) Prior Publication Data

US 2006/0056062 A1    Mar. 16, 2006

(30) Foreign Application Priority Data

Aug. 27, 2004 (TW) ............... 93125740 A

(51) Int. Cl.
*G02B 3/02* (2006.01)
(52) U.S. Cl. ............... 359/708; 359/643; 359/644
(58) Field of Classification Search ........... 359/708, 359/643, 644, 645, 646, 647, 712, 713, 714, 359/715, 716
See application file for complete search history.

(56) References Cited

U.S. PATENT DOCUMENTS

2005/0094283 A1* 5/2005 Cheng .................. 359/643

* cited by examiner

*Primary Examiner*—Timothy Thompson
(74) *Attorney, Agent, or Firm*—Troxell Law Office, PLLC

(57) ABSTRACT

An optical system for a laser riflescope includes, an objective lens group (1), an eyepiece lens element (3) defining an optical axis with the objective lens group, and an erector lens group (2) positioned between the objective lens group and the eyepiece lens element. The eyepiece lens element includes an aspheric element having a diffractive configuration (33). The aspheric element combines with a spherical lens so as to form a hybrid lens. Thus, the spherical aberration of the optical system is eliminated by the aspheric element and the chromatic aberration is eliminated by the diffractive configuration.

16 Claims, 2 Drawing Sheets

OPTICAL SYSTEM FOR LASER RIFLESCOPE

BACKGROUND OF THE INVENTION

1. Field of the Invention

The present invention generally relates to an optical system for a laser riflescope, and particularly relates to an optical system for a laser riflescope with a reduced number of optical elements while improving optical performance.

2. Description of Prior Art

As shown in FIG. 1, the optical system for a conventional riflescope generally includes an objective lens group 4, an erector lens group 5, an eyepiece lens (ocular lens) group 6 and a reticle 7 for facilitating aiming at the object. The optical system generally includes 9–12 spherical lenses in three groups. However, it is well known that, the spherical surfaces of the lenses are optically accurate only proximate to the optical axis while showing increasing refraction errors proportionally to the distance from the optical axis toward the periphery of the lens system, increasing with the distance from the optical axis. Such errors are both errors in deflection of the light beam as well as, more importantly yet, reflection errors. This phenomenon is known as spherical aberration. To eliminate the spherical aberration, additional correcting lenses are generally employed. However, this increases the potential for distortion, ghosting and flare. Further, the weight, bulk and complexity of the optical system are increased, since only glass lenses are generally used to assure compliance with the harsh environment reliability needs of the riflescope. This is particularly true for a laser riflescope that includes in its optical system, in addition to the objective lens group, the erector lens group and the eyepiece lens group, an LD (Laser Diode), an APD (Avalanche Photoelectric Diode), an LED (Light Emitting Diode) lens element and a plurality of prisms. Further, data processing and calculation programs are also provided in the laser riflescope for object distance calculation. All these components make the laser riflescope much heavier and bulkier than a common riflescope. Therefore, the rifle with the laser riflescope mounted thereon must be hold up by a supporter for facilitating stable aiming and shooting. This is rather inconvenient for the carry and usage of the rifle.

In addition, it is known that light rays of different colors do not focus at the same location after passing through a glass lens system. This phenomenon is known as chromatic aberration, which is present when images formed by different colors of light, which make up "white" light, are at different distances from the lens or are of unequal size. Chromatic aberration of a lens is seen as fringes of color around the image. This kind of aberration is eliminated by the optical design, conventionally combining different types of glass that will form several colors at the same point. However, this method further increases the weight and bulk of the riflescope.

Accordingly, a light weight and low bulk laser riflescope capable of eliminating both spherical aberration and chromatic aberration is desired to overcome the above disadvantages present in the prior art.

SUMMARY OF THE INVENTION

The object of the present invention is to provide an optical system for a laser riflescope with a reduced number of optical elements while being capable of eliminating both spherical aberration and chromatic aberration.

To achieve the above object of the present invention, an optical system for a laser riflescope in accordance with the present invention includes an objective lens group, an eyepiece lens element defining an optical axis with the objective lens group, and an erector lens group positioned between the objective lens group and the eyepiece lens element. The eyepiece lens element includes an aspheric element having a diffractive configuration facing the erector lens group. The aspheric element combines with a spherical lens so as to form a hybrid lens. Thus, the spherical aberration of the optical system is eliminated by the aspheric element and the chromatic aberration is eliminated by the diffractive configuration.

The aspheric element of the eyepiece lens element is made of a resin material and has a thickness between 0.07 and 0.15 mm along the optical axis. The surface of the aspheric element proximate to the erector lens group is aspheric, and the opposite surface thereof is spherical. The diffractive configuration is arranged on the aspheric surface.

To assure a long eye relief, the focal length of the eyepiece lens element satisfies the following condition: 35 mm<F<65 mm. The eyepiece lens element produces a large exit pupil, and satisfies the following condition: 3<S/F<4, where F is the focal length of the eyepiece lens element and S is the incremental sag of the aspheric surface at a clear aperture of the eyepiece lens element.

BRIEF DESCRIPTION OF THE DRAWINGS

The present invention may best be understood through the following description with reference to the accompanying drawings, in which.

DETAILED DESCRIPTION OF THE INVENTION

Figure 1:
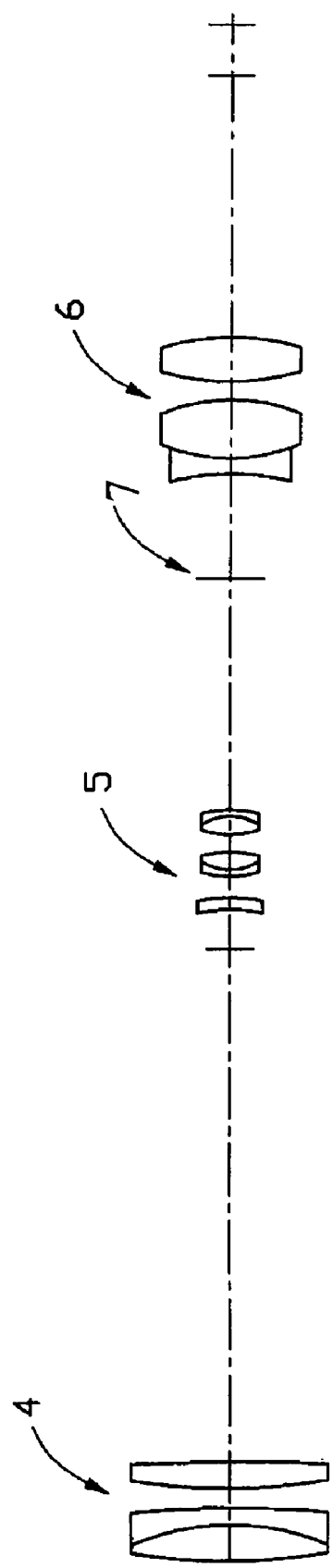
FIG. 1 is a schematic diagram of a conventional optical system for a laser riflescope.
Figure 2:
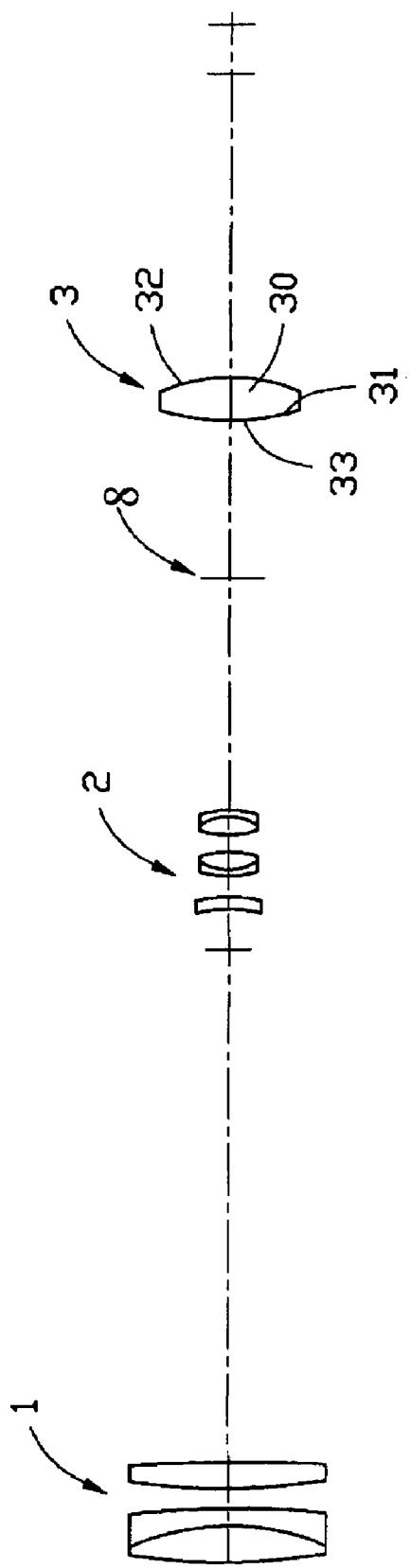
FIG. 2 is a schematic diagram of an optical system for a laser riflescope in accordance with the present invention.

Referring to FIG. 2, an optical system for a laser riflescope in accordance with the present invention includes an objective lens group 1, an eyepiece lens element 3 defining an optical axis with the objective lens group 1, an erector lens group 2 positioned between the objective lens group 1 and the eyepiece lens element 3, and a reticle 8 positioned between the erector lens group 2 and the eyepiece lens element 3 for facilitating aiming at the object.

The objective lens group 1 consists of three spherical lenses, the erector lens group 2 consists of five spherical lenses, and the eyepiece lens element 3 consists of one aspheric lens 30. To assure a long eye relief, the focal length of the eyepiece lens element 3 satisfies the following condition: 35 mm<F<65 mm. The eyepiece lens element 3 may be a single lens formed by a glass grinding method, a glass molding method or a plastic molding method. Alternatively, the eyepiece lens element 3 may be a hybrid lens formed by a replica method (a molding and transfer method), which is preferred in the present invention. The eyepiece lens element 3 includes an aspheric element having a diffractive configuration 33 facing the erector lens group 2. The aspheric element combines with a spherical lens, which is preferably made of glass, so as to form a hybrid lens. The aspheric element has an aspheric surface 31 proximate to the erector lens group 2. A reflection suppressing coating is typically provided on the aspheric surface 31 in order to reduce ghost and flare caused by reflection on the lens surface in view of the resin/glass hybrid structure. A spherical surface 32 is provided on the eyepiece lens element 3 opposite to the aspheric surface 31. The diffractive configuration 33 is provided on the aspheric surface 31. The aspheric surface 31 complies with the following equation:

$$Z = \frac{cH^2}{1+[1-(K+1)c^2H^2]^{1/2}} + AH^4 + BH^6 + CH^8 + DH^{10}$$

Where:
Z is Sag value along the optical axis;
c is the base curvature (1/radius) of the surface;
H is the semi-diameter height;
K is the conic coefficient; and
A, B, C and D are the $4^{th}$-order, $6^{th}$-order, $8^{th}$-order and $10^{th}$-order aspheric coefficients, respectively.

Coefficients for the aspheric surface 31 are:

| C | K | A | B | C | D |
|---|---|---|---|---|---|
| 1/70 | −43.4177 | −2.44156E−6 | 0 | 0 | 0 |

The eyepiece lens element 3 produces a large exit pupil, and satisfies the following condition: 3<S/F<4, where F is the focal length of the eyepiece lens element 3 and S is the incremental sag of the aspheric surface 31 at a clear aperture of the eyepiece lens element 3.

The diffractive configuration 33 may be either formed by a VLSI (Very Large Scale Integration) photolithographic technique or some other techniques (such as electron direct-write or laser exposure direct-write), and satisfies the following phase equation:

$$\Phi(H) = \frac{2\pi}{\lambda_0}[K_1H^2 + K_2H^4 + K_3H^6 + K_4H^8 + K_5H^{10}]$$

Where:
H is the height in the vertical direction from the optical axis;
$\lambda_0$ is the design wavelength; and
$K_i$ is a phase coefficient (i=1, 2, 3, 4, 5).

Phase coefficients for the diffractive configuration 33 are:

| $K_1$ | $K_2$ | $K_3$ | $K_4$ | $K_5$ |
|---|---|---|---|---|
| 0.84838 | −0.043438 | −7.463554E−5 | 0 | 0 |

The aspheric element of the eyepiece lens element 3 is preferably made of a resin material and has a thickness between 0.07 mm and 0.15 mm along the optical axis. Therefore, such a thin element will not seriously adversely affect the optical performance of the optical system when subject to a large temperature variation. Further, the aspheric element with the diffractive configuration 33 formed thereon is preferably arranged on the inner side of the eyepiece lens element 3 facing toward the erector lens group 2. This avoids damage to the diffractive configuration 33 since the diffractive configuration 33 is prevented from direct contact with air.

In accordance with the preferred embodiment of the present invention, the eyepiece lens element 3 of the present invention only consists of a hybrid lens 30 that is aspheric to effectively eliminate the spherical aberration, thereby eliminating additional correcting lenses. The chromatic aberration is eliminated by a diffractive configuration 33 on the hybrid lens 30, in place of combining different types of glass that will form several colors at the same point, as in the prior art. Accordingly, the lens count of the present optical system for a laser riflescope is significantly reduced through the use of the aspheric hybrid lens 30 that reduces the overall physical length as well. Optical performance of the present optical system is improved through the use of the aspheric hybrid lens 30 with the diffractive configuration 33 provided thereon.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical system for a riflescope comprising an objective lens group, an eyepiece lens element defining an optical axis with the objective lens group, and an erector lens group positioned between the objective lens group and the eyepiece lens element, the eyepiece lens element comprising an aspheric element having a diffractive configuration and combining with a spherical lens;
   wherein, the diffractive configuration of the aspheric element faces the erector lens group, and the aspheric element satisfies the following equation:

$$Z = \frac{cH^2}{1+[1-(K+1)c^2H^2]^{1/2}} + AH^4 + BH^6 + CH^8 + DH^{10}$$

where: Z is Sag value along the optical axis, c is the curvature (1/radius) of the surface, H is the semi-diameter height, K is the conic coefficient, and A, B, C and D are the $4^{th}$-order, $6^{th}$-order, $8^{th}$-order and $10^{th}$-order aspheric coefficients, respectively; wherein the eyepiece lens element satisfies the following condition: 3<S/F<4, where F is the focal length of the eyepiece lens element and S is the incremental sag of the aspheric element at a clear aperture of the eyepiece lens element.

2. The optical system for a riflescope as claimed in claim 1, wherein the coefficients for the aspheric element are: c=1/70, K=−43.4177, A=−2.44156E−6, B=0, C=0 and D=0.

3. The optical system for a riflescope as claimed in claim 1, wherein the diffractive configuration of the aspheric element satisfies the following phase equation:

$$\Phi(H) = \frac{2\pi}{\lambda_0}[K_1H^2 + K_2H^4 + K_3H^6 + K_4H^8 + K_5H^{10}]$$

where: H is the height in the vertical direction from the optical axis, $\lambda_0$ is the design wavelength, and $K_1$, $K_2$, $K_3$, $K_4$, and $K_5$ are phase coefficients.

4. The optical system for a riflescope as claimed in claim 3, wherein the phase coefficients for the diffractive configuration of the aspheric element are: $K_1=0.84838$, $K_2=-0.043438$, $K_3=-7.463554E-5$, $K_4=0$ and $K_5=0$.

5. The optical system for a riflescope as claimed in claim 1, wherein the aspheric element is made of a resin material.

6. The optical system for a riflescope as claimed in claim 5, wherein the aspheric element has a thickness between 0.07 mm and 0.15 mm along the optical axis.

7. The optical system for a riflescope as claimed in claim 1, wherein the spherical lens is made of glass.

8. An optical system for a riflescope comprising an objective lens group, an eyepiece lens element defining an optical axis with the objective lens group, and an erector lens group positioned between the objective lens group and the eyepiece lens element, the eyepiece lens element comprising an aspheric element having a diffractive configuration and combining with a spherical lens, and satisfying the following condition: $3<S/F<4$, where F is the focal length of the eyepiece lens element and S is the incremental sag of the aspheric element at a clear aperture of the eyepiece lens element.

9. The optical system for a riflescope as claimed in claim 8, wherein the diffractive configuration of the aspheric element faces the erector lens group.

10. The optical system for a riflescope as claimed in claim 9, wherein the aspheric element eliminates the spherical aberration of the optical system and the diffractive configuration eliminates the chromatic aberration of the optical system.

11. The optical system for a riflescope as claimed in claim 9, wherein the aspheric element satisfies the following equation:

$$Z = \frac{cH^2}{1+[1-(K+1)c^2H^2]^{1/2}} + AH^4 + BH^6 + CH^8 + DH^{10}$$

where: Z is Sag value along the optical axis, c is the curvature (1/radius) of the surface, H is the semi-diameter height, K is the conic coefficient, and A, B, C and D are the $4^{th}$-order, $6^{th}$-order, $8^{th}$-order and $10^{th}$-order aspheric coefficients, respectively.

12. The optical system for a riflescope as claimed in claim 9, wherein the diffractive configuration satisfies the following phase equation:

$$\Phi(H) = \frac{2\pi}{\lambda_0}[K_1 H^2 + K_2 H^4 + K_3 H^6 + K_4 H^8 + K_5 H^{10}]$$

where: H is the height in the vertical direction from the optical axis, $\lambda_0$ is the design wavelength, and $K_1$, $K_2$, $K_3$, $K_4$ and $K_5$ are phase coefficients.

13. The optical system for a riflescope as claimed in claim 9, wherein the aspheric element is made of a resin material, and has a thickness between 0.07 mm and 0.15 mm along the optical axis.

14. An optical system for a riflescope comprising
   an objective lens group;
   an eyepiece lens element, defining an optical axis with the objective lens group, and comprising an aspheric element which has a diffractive configuration and combines with a spherical lens, wherein the aspheric element eliminates the spherical aberration of the optical system and the diffractive configuration thereon eliminates the chromatic aberration of the optical system; and
   an erector lens group positioned between the objective lens group and the eyepiece lens element;
   wherein, the eyepiece lens element satisfies the following condition: $3<S/F<4$, where F is the focal length of the eyepiece lens element and S is the incremental sag of the aspheric element at a clear aperture of the eyepiece lens element.

15. The optical system for a riflescope as claimed in claim 14, wherein the spherical lens is made of glass, and the aspheric element is made of resin.

16. The optical system for a riflescope as claimed in claim 15, wherein the aspheric element has a thickness between 0.07 mm and 0.15 mm along the optical axis.

* * * * *